Feb. 19, 1957  A. C. BRUMBY  2,781,693
SPECTACLES HAVING INTERCHANGEABLE LENS
Filed July 20, 1951  2 Sheets-Sheet 1
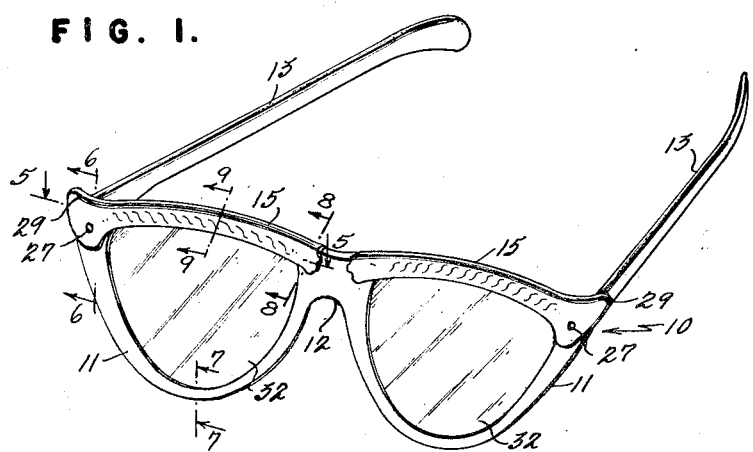
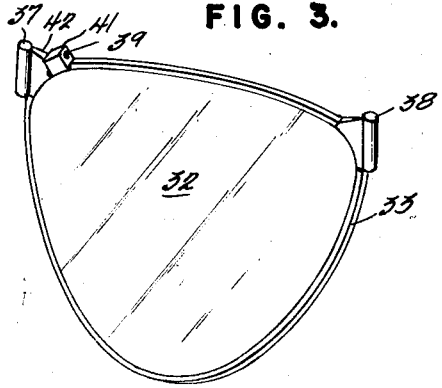
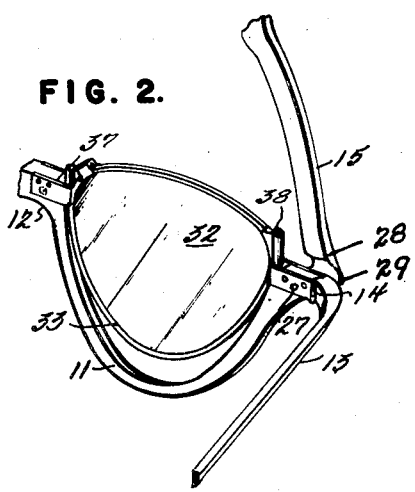
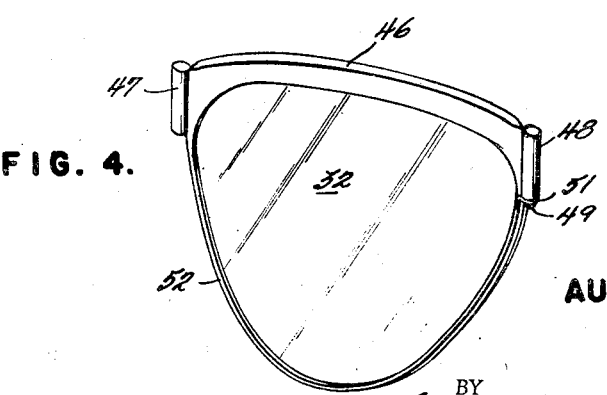
INVENTOR
AUGUSTA C. BRUMBY
BY
ATTORNEYS Feb. 19, 1957 A. C. BRUMBY 2,781,693
SPECTACLES HAVING INTERCHANGEABLE LENS
Filed July 20, 1951 2 Sheets-Sheet 2
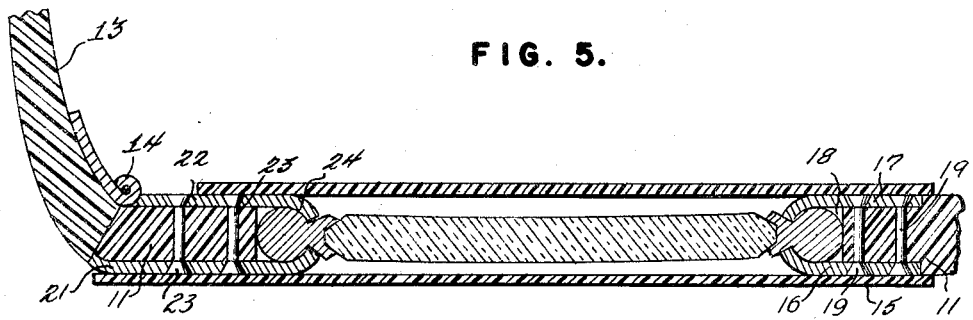
FIG. 5.
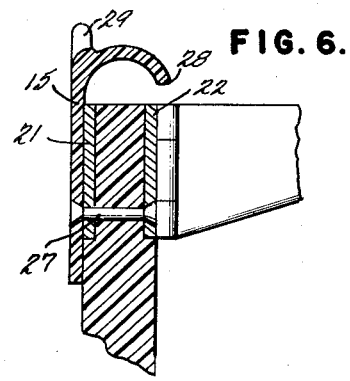
FIG. 6.
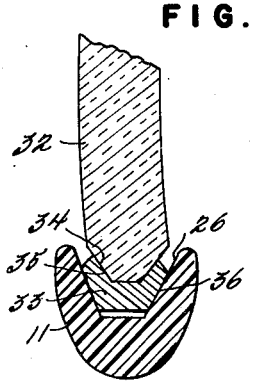
FIG. 7.
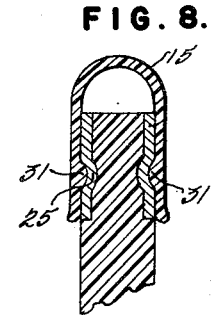
FIG. 8.
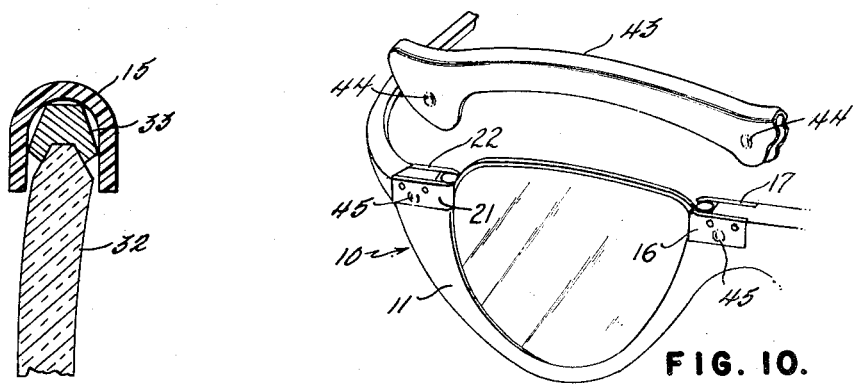
FIG. 9
FIG. 10.
INVENTOR
AUGUSTA C. BRUMBY
BY
ATTORNEYS

2,781,693
SPECTACLES HAVING INTERCHANGEABLE LENS

Augusta C. Brumby, Atlanta, Ga.

Application July 20, 1951, Serial No. 237,784

5 Claims. (Cl. 88—47)

This invention relates to spectacles and more particularly to spectacles having replaceable lens.

Recently eyeglasses have been made in a wide variety of colors and designs as well as different shapes of frames to introduce an element of style in the glasses. The idea of harmonizing the color of the glasses with the clothes worn by the wearer has been frequently suggested. The rather high cost of lens, particularly when the degree of correction in them is high, has interfered with the adoption of costume harmonizing. Many attempts have been made to overcome this difficulty by providing spectacles in which the lens may be replaced by the wearer and thus transferred from one set of frames to another. The idea of spectacles with interchangeable lens is also appealing to some far-sighted persons who object to bifocals and would prefer to change the lens in a single frame.

Since the widest use of spectacles with replaceable lenses is by those interested in style, it is imperative that the structure permitting the replacement of the lens be attractive. The lens should not be obviously replaceable and preferably should have the appearance of conventional eyeglasses of different styles. It is, of course, desirable that the structural elements locking the lens in place should be concealed when the glasses are assembled.

Because of the importance of positioning the lens accurately within the frames, the replaceable lens structure must hold the lens positively and firmly in the proper position. The fragile nature of the lens makes protection of the lens essential and it is highly desirable that the frictional forces holding the lens within the frame of the glasses be borne by some structure other than the lens. Since spectacles with replaceable lens will in most instances be used by women, a simple mechanical structure allowing easy changing of the lenses is essential. Moreover, the structure should be operable with lens having a high degree of correction.

It is an object of this invention to provide novel spectacles having replaceable lens.

Another object of this invention is to provide stylish spectacles with replaceable lens in which the structure holding the lens in place is concealed and the spectacles have the appearance of normal eyeglasses.

A further object of this invention is to provide spectacles having replaceable lens which are locked firmly and accurately in position when the glasses are assembled for use.

Another object of this invention is to provide a device for protecting the lens and preventing their being cracked or chipped as they are transferred from one set of lens to another.

Still another object of this invention is to provide spectacles with a replaceable lens in which the removal of one frame and installation in another is a simple, easy operation which may be quickly performed.

With these and other objects in view, as will become apparent in the following description, this invention resides in spectacles having replaceable lens in which the lens are surrounded by a rim having keys slidable in keyways in the lens receiving members of the frames of the glasses to position the lens in the frame, and a lens retaining bar adapted to hold the lens in the frames and cover the structural elements holding the lens in position.

In the drawings:

Figure 1 is a perspective view of the completely assembled spectacles of this invention;

Figure 2 is a perspective view of a portion of the spectacles showing the lens partially removed from the frames;

Figure 3 is a perspective view of a lens having a preferred embodiment of a protective rim;

Figure 4 also is a perspective view showing a modification of the rim adapted to protect the lens;

Figure 5 is a cross-sectional view along the section line 5—5 in Figure 1 illustrating the structure for locking the lens in position within the frame;

Figure 6 is a sectional view along section line 6—6 in Figure 1;

Figure 7 is a sectional view along the section line 7—7 in Figure 1 showing the support of the lower edge of the lens in the frame;

Figure 8 is an enlarged sectional view along the section line 8—8 in Figure 1 of the drawings illustrating a snap catch for holding the lens retaining bar in position;

Figure 9 is a cross-sectional view along the section line 9—9 in Figure 1;

Figure 10 is a perspective view of a modified form of the invention in which the lens retaining bar is completely separable from the frame.

Referring to Figure 1 of the drawings, the spectacles of this invention are illustrated having a frame, indicated generally by reference numeral 10, having a pair of arcuate lens receiving members 11 joined by a bridge 12. A pair of temple bars 13 of any conventional design are connected to the outer edges of the lens receiving members 11. In most instances, the temple bars 13 will be connected to the remainder of the frame of the glasses by means of a hinge 14 to allow the temple bars to be folded against the lens receiving members 11.

A lens retaining bar 15 is movably connected to each of the lens retaining members in a manner allowing the bar to be moved to an out-of-the-way position opening the lens retaining members across the top to allow insertion of a lens. The lens retaining bars 15 may be decorated in any manner to provide a decorative flange across the top of the glasses and are preferably of sufficient width to conceal the mechanism allowing replacement of lens in the frame of the glasses. The lens retaining bars 15 are provided with a frictional or snap fitting at one or both ends to hold the bar in the position illustrated in Figure 1 after the glasses have been assembled.

The lens receiving members 11 have substantially the shape of the customary lens and ordinarily will have an upper portion of considerable width tapering in a curved manner to a bottom portion somewhat narrower than the upper portion. A pair of plates 16 and 17 are secured to the front and back faces respectively of the upper edge of the arcuate lens receiving members 11 adjacent the bridge 12. The ends of the plates 16 and 17 are curved towards each other and extend inwardly beyond the lens retaining member to provide a key-way 18 along the inner surface of the lens retaining members 11. Plates 16 and 17 are held in place by any suitable means such as rivets 19 extending through the lens retaining members 11.

At the outer upper edge of each of the lens retaining members 11, a pair of plates 21 and 22, similar to plates 16 and 17, are secured by suitable means, such as rivets 23. In the structure illustrated in Figure 5 of the drawings, the plate 22 secured to the rear face of the lens retaining member 11 forms a part of the hinge 14 on which the temple bar 13 is mounted. Plates 21 and 22 are curved in a manner similar to plates 16 and 17 to form a key-way 24 at the outer upper edge of the lens receiving members 11. The key-ways 18 and 24 are preferably parallel tubular openings to permit lens to be inserted in the frames from the top with a downward movement. The plates 16 and 17 are provided with a dimple 25, best illustrated in Figure 8 of the drawings, to provide a snap closure engaging a knob extending from the inner surface of the lens retaining bar 15 and holding it firmly in position.

A groove 26 extends downwardly from key-ways 18 and 24 along the inner surface of the lens receiving members 11 to provide a seat for the lens. The groove 26 may be somewhat enlarged at its upper ends to provide extensions of the key-ways 18 and 24. It is preferred that the grooves be tapered as illustrated in Figure 7 to provide a seat holding the lens firmly in the frames around its periphery and preventing any lateral movement of the lens in the frame.

The lens retaining bar 15 is a generally channel-shaped member which is preferably pivotally connected to the lens receiving members 11 in a manner allowing the bar 15 to be rotated upwardly to provide an opening across the top of the lens receiving member for the assembly of the glasses. Referring to Figure 6 of the drawings, it will be noticed that the lens retaining bar 15 is pivotally mounted on a rivet 27 extending through the lens receiving member 11 near its upper outer corner. In order to permit the lens retaining bar to clear the temple bar 13 as the lens retaining bar is rotated upwardly, the bar 15 terminates at a point 28, permitting the bar to swing clear of the temple bars. A wing 29 may extend from the outer end of the lens retaining bar 15 in front of the lens receiving member to cover that member. The wing 29 and bar 15 may be of any desired shape and decorated in any suitable manner to form a decorative flange across the spectacles. In order to clarify the structure for supporting bar 25, the rivet 27 has been shown extending completely through the bar 15 and exposed on the front surface of the bar 15. The rivet may, of course, be secured on the interior surface of the bar 15, or may be covered with decorations, so that it is not visible and the appearance of the glasses is similar to conventional glasses.

Near its center, the lens retaining bar 15 is substantially channel shaped and adapted to engage a rim, hereinafter described, at the top of the lens as illustrated in Figure 9, and hold the lens firmly seated in the groove 26. At its inner end the lens retaining bar 15 is provided with knobs 31 which engage the dimples 25 in the plates 16 and 17 to hold the lens retaining bar firmly in place. While the spectacles have been illustrated with a lens retaining bar 15 pivotally connected at its outer end to the remainder of the frames of the glasses, it will be appreciated that the pivotal support could be adjacent the bridge 12 and the snap fitting composed of dimples 25 and knobs 31 located at the outer edge of the lens receiving member 11.

Referring to Figure 2 of the drawings, in which the lens adapted for use with the frames described above are illustrated as detached from the frames, a lens 32 is illustrated having a rim 33 extending completely around the lens and engaging the edge thereof. As is best illustrated in Figure 7, the lens 32 is preferably tapered along its outer edge 34 and is engaged by the substantially V-shaped inner edge 35 of the rim 33. The outer surface 36 of the rim 33 is tapered to fit snugly in the groove 26 along the inner surface of the lens receiving member 11.

Extending from the outer surface of the rim 33 adjacent the upper corners of the lens 32 are a pair of keys 37 and 38. The keys are suitably shaped and positioned to fit snugly within the key-ways 18 and 24 at the upper ends of the lens receiving members 11. Preferably, the key-ways 18 and 24 and the keys 37 and 38 will be parallel and will have a uniform cross-section of a size and shape whereby the keys slide in the key-ways and fit snugly within them over their entire length. It will be appreciated that the key-ways may be of other shapes and their walls may slope to a point of minimum width near the bottom, it only being essential that the keys 37 and 38 be able to move in the key-ways 18 and 24 to a position holding the lens in the frames. In some instances key-ways 18 and 24, and keys 37 and 38 may be of different shapes to insure the insertion of the proper lens and key in the key-way. In a preferred embodiment of the glasses, the space between keys 37 and 38 is very slightly less than the distance between the key-ways 18 and 24 when the glasses are not assembled. Then, when the glasses are assembled, the resilience of members 11 causes a positive engagement of the keys and key-ways to fix the position of the lens accurately and pulls the walls of the groove 26 firmly against the surface 36 of rim 33.

The rim 33 is held tightly about the lens 32 by means of a screw 39 engaging a lug 41 attached to one end of the rim and a shoulder 42 providing a support for the key member 37. As the screw 39 is tightened it engages a threaded socket, not shown, in shoulder 42 and pulls the rim tightly against the edge of the rim to provide a protecting member extending completely around the edge of the lens.

The rim 33 is preferably of a thin metallic section, such as a wire, which protects the edge of the lens against chipping and strain as the lens are transferred from one frame to another. The key members 38 engage the key-ways 18 and 24 to provide a tight metal-to-metal fitting accurately positioning the lens within the frame.

In the assembly of the spectacles, the lens retaining bars 15 are rotated upwardly to provide an opening at the upper ends of the lens receiving members 11. Since the space between the inner and outer ends of the lens receiving members 11 is fully opened, lens of any thickness and having any degree of correction may be inserted within the lens. The lower ends of the keys 37 and 38 are inserted in the key-ways 18 and 24 and the lens slid downwardly into the lens receiving member. The walls of the tapered groove 26 in the lens receiving members 11 engage the outer surface of the rim 33 and hold the lens firmly against lateral movement. The snug fitting of the key into the key-way accurately positions the lens within the lens receiving member 11. After the lens have been moved all the way into the lens receiving members 11, the lens retaining bar 15 is pivoted to the position illustrated in Figure 1 and is held firmly in place by the frictional engagement of knobs 31 and dimples 35. As illustrated in Figure 9, the lens retaining bar 15 engages the rim 33 and holds the rim firmly against upward movement.

Referring to Figure 10 in the drawings, a modified form of the invention is illustrated having a lens retaining bar 43 adapted to be completely removed from the remainder of the frame 10. The bar 43 is provided with snap fasteners 44 at each end adapted to engage dimples 45 in plates secured to the lens retaining members 11 to hold the bar 43 firmly in place. With the embodiment of the invention illustrated in Figure 10, the lens retaining bars 43 may be transferred from one set of frames to another to provide spectacles having a decorative flange of contrasting color extending across the tops of the eyeglasses. For clarity in illustration, the bar 43 has been illustrated having irregularities in its outer surface corresponding to snap fasteners 44. It will be appreciated that such irregularities are not essential and the outer surface of the bar 43 may be smooth or decorated in any desirable manner.

A modification of the rim extending around the lens is illustrated in Figure 4 of the drawings. In that modification, the rim is provided with a top bar 46 of considerable width extending across the top of the lens. A key 47 is mounted at one end of the bar 46 and a second key 48 is mounted at the other end. The same considerations governing the positioning of keys 37 and 38 apply to keys 47 and 48. The key 48 is drilled and tapped at its lower end to receive a screw 49 which engages a lug 51 on the end of the rim, indicated by reference numeral 52, extending around the lens 32 from bar 46. Tightening of screw 49 tightens the rim 52 about the lens and holds it firmly in place. The lug 51 merely forms an extension of key 48 and enters the key-way 18 in the manner described for the form of the invention illustrated in Figure 2 of the drawings.

I claim:

1. In spectacles having a lens removably mounted in a lens receiving member in a frame, the improvement comprising a generally U-shaped lens receiving member having parallel key-ways, one at each end thereof, each of said keyways including an enlarged pocket opening upwardly with respect to the respective ends of said U-shaped lens receiving member, a lens, a rim around the edge of said lens, said rim including a flexible metallic strip, a threaded socket at one end of said strip, a lug at the other end of said strip, and a screw engaging said lug and said socket to hold said rim tightly around said lens, said rim having keys extending laterally therefrom with each of said keys including a neck portion connecting an enlarged head portion to said rim, said enlarged head portions being slidable downwardly into the enlarged upwardly opening pockets of said key-ways in said lens receiving member to hold said lens in position, said head portion and said pocket having interengaging portions which prevent relative lateral movement between the head portion and the pocket.

2. Spectacles comprising a frame embodying a U-shaped lens receiving member having a groove therein and co-extensive therewith, a key-way at each end of said groove, each of said keyways including an enlarged pocket opening upwardly with respect to the respective ends of said U-shaped lens receiving member, a lens, a rim extending around said lens and secured thereto, keys extending from said rim with each of said keys including a neck portion connecting an enlarged head portion to said rim, said enlarged head portions being slidable downwardly into the enlarged upwardly opening pockets of said key-ways at the ends of said groove, said head portion and said pocket having interengaging portions which prevent relative lateral movement between the head portion and the pocket, and a substantially channel-shaped retaining bar adapted to engage said frame, said bar enclosing the upper portion of said lens to hold said lens in said lens receiving member with said keys in said key-ways.

3. Spectacles comprising a frame embodying a U-shaped lens receiving member having a groove therein and co-extensive therewith, a key-way at each end of said groove, each of said keyways including an enlarged pocket opening upwardly with respect to the respective ends of said U-shaped lens receiving member, a lens, a rim extending around said lens and secured thereto, keys extending from said rim with each of said keys including a neck portion connecting an enlarged head portion to said rim, said enlarged head portions being slidable downwardly into the enlarged upwardly opening pockets of said key-ways at the ends of said groove, said head portion and said pocket having interengaging portions which prevent relative lateral movement between the head portion and the pocket, and a substantially channel-shaped pivotally mounted retaining bar movable to a position to engage said frame and the upper portion of said lens to hold said lens in said lens receiving member with said keys in said key-ways.

4. Spectacles comprising a frame having channeled, generally U-shaped lens receiving portions joined by a bridge, parallel keyways at the terminal ends of said U-shaped lens receiving portions, each of said keyways including an enlarged pocket opening upwardly with respect to the ends of the respective U-shaped lens receiving portions, lenses, rims extending around said lenses, parallel keys carried by said rims positioned to slidably enter said keyways with each of said keys including a neck portion connecting an enlarged head portion to said rim, said enlarged head portions being slidable downwardly into the enlarged upwardly opening pockets of said keyways, and said head portion and said pocket having interengaging portions which prevent relative lateral movement between the head portion and the pocket when said lenses are positioned in said U-shaped lens receiving portions to rigidly brace said frame transversely of the spectacles across the tops of said U-shaped lens receiving portions.

5. Spectacles comprising a frame having channeled, generally U-shaped lens receiving portions joined by a bridge, parallel keyways at the terminal ends of said U-shaped lens receiving portions, each of said keyways including an enlarged pocket opening upwardly with respect to the ends of the respective U-shaped lens receiving portions, lenses, rims extending around said lenses, parallel keys carried by said rims positioned to slidably enter said keyways with each of said keys including a neck portion connecting an enlarged head portion to said rim, said enlarged head portions being slidable downwardly into the enlarged upwardly opening pockets of said keyways, and said head portion and said pocket having interengaging portions which prevent relative lateral movement between the head portion and the pocket when said lenses are positioned in said U-shaped lens receiving portions to rigidly brace said frame transversely of the spectacles across the tops of said U-shaped lens receiving portions, and channel shaped retaining bars movable to a position to engage said frame and the upper portion of said lenses to conceal said keys and hold the same in said keyways.

References Cited in the file of this patent

UNITED STATES PATENTS

| | | |
|---|---|---|
| 2,362,002 | Gluck | Nov. 7, 1944 |
| 2,383,572 | Splaine et al. | Aug. 28, 1945 |
| 2,471,338 | Massaro | May 24, 1949 |
| 2,473,619 | Talobre | June 21, 1949 |
| 2,479,754 | Marks | Aug. 23, 1949 |
| 2,482,144 | Allen | Sept. 20, 1949 |
| 2,524,140 | Retz | Oct. 3, 1950 |
| 2,534,748 | Wilson | Dec. 19, 1950 |
| 2,551,144 | Lindemann et al. | May 1, 1951 |
| 2,553,496 | Castelli | May 15, 1951 |
| 2,577,380 | Stegeman | Dec. 4, 1951 |
| 2,586,546 | Longenecker | Feb. 19, 1952 |
| 2,652,746 | Shanks | Sept. 22, 1953 |

FOREIGN PATENTS

| | | |
|---|---|---|
| 463,000 | Great Britain | Mar. 19, 1937 |
| 914,794 | France | July 1, 1946 |
| 608,735 | Great Britain | Sept. 20, 1948 |